UNITED STATES PATENT OFFICE.

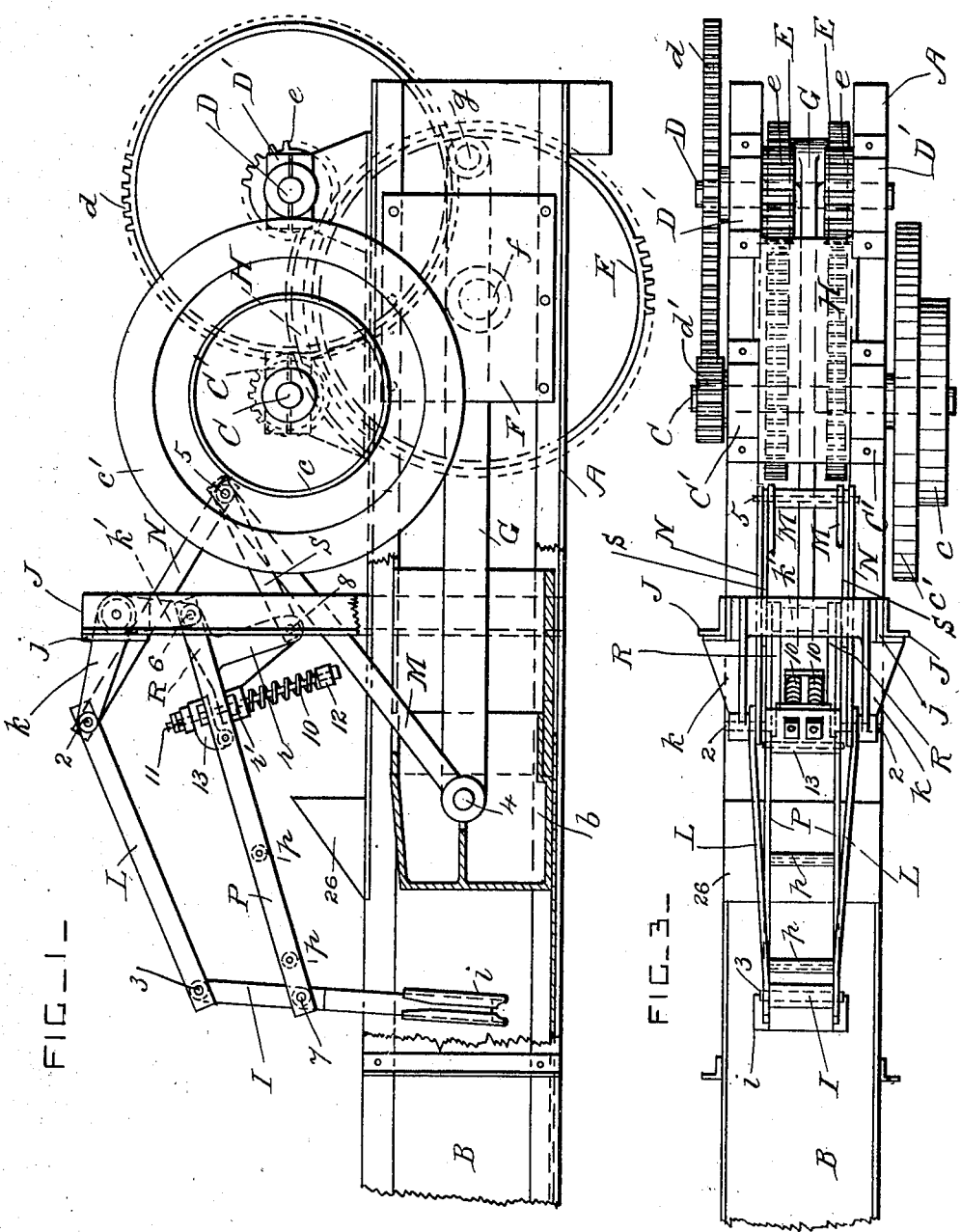

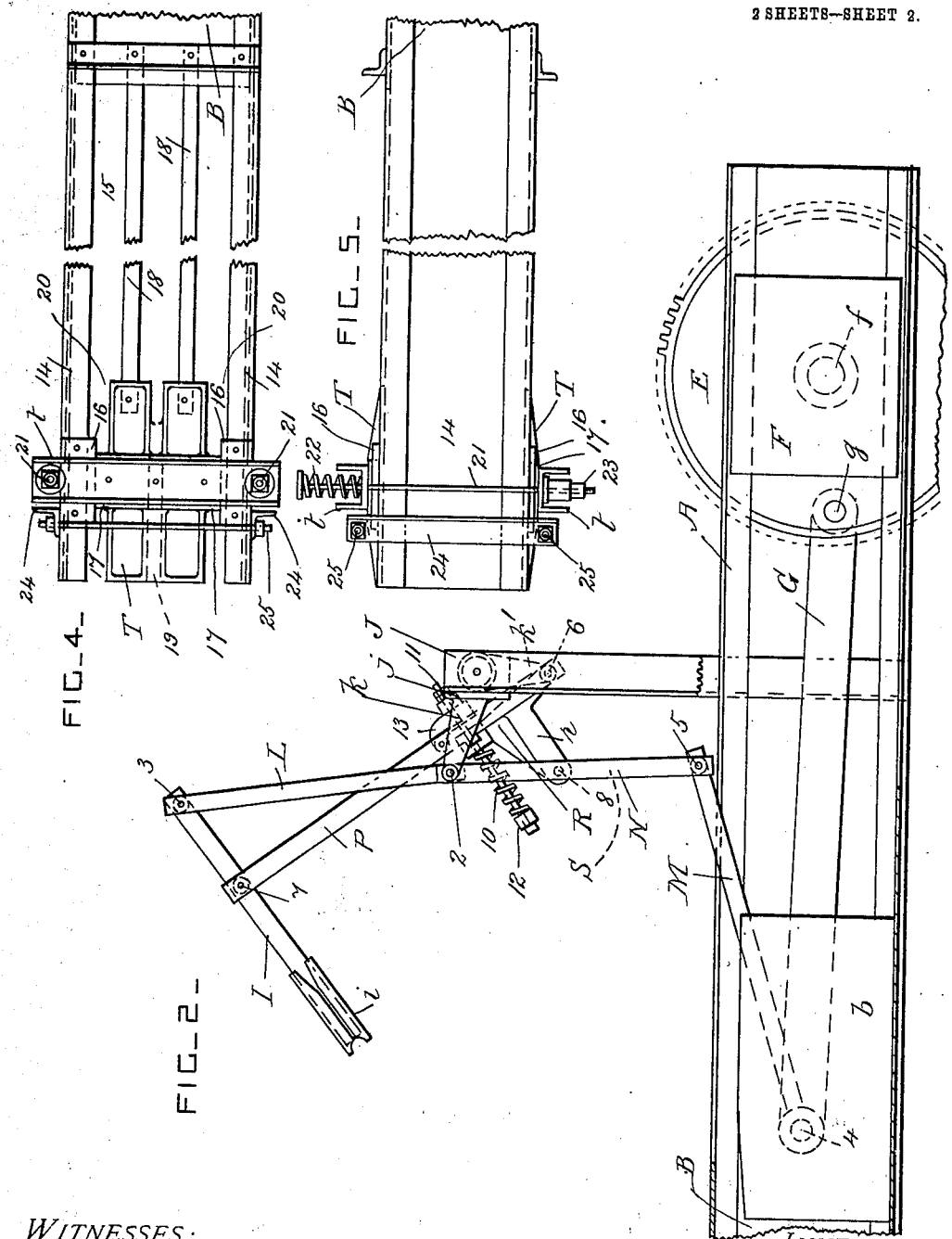

DANIEL S. BEARD, OF WAYNESBORO, PENNSYLVANIA, ASSIGNOR TO THE GEISER MANUFACTURING COMPANY, OF WAYNESBORO, PENNSYLVANIA.

HAY-PRESS.

No. 926,382.  Specification of Letters Patent.  Patented June 29, 1909.

Application filed November 4, 1908. Serial No. 461,045.

*To all whom it may concern:*

Be it known that I, DANIEL S. BEARD, a citizen of the United States, residing at Waynesboro, in the county of Franklin and State of Pennsylvania, have invented certain new and useful Improvements in Hay-Presses; and I do hereby declare the following to be a full, clear, and exact description of the invention, such as will enable others skilled in the art to which it appertains to make and use the same.

This invention relates to presses for baling hay and other material which can be formed into bales; and it consists in the novel construction and combination of the parts hereinafter fully described and claimed.

In the drawings, Figure 1 is a side view of the feeding end portion of the press with one side of the bale chamber broken away to show the plunger. Fig. 2 is a diagram showing the feeder-bar in its raised position. Fig. 3 is a plan view of the parts shown in Fig. 1. Fig. 4 is a side view of the delivery end portion of the press; and Fig. 5 is a plan view of the same.

A is the frame of the press which is preferably mounted on wheels in any approved manner.

B is the baling-chamber which is arranged at the middle part of the frame A, and which is provided with a slidable plunger b.

C is the driving-shaft of the press provided with a driving-pulley c and a fly-wheel c'.

D is a countershaft, and d is a toothed wheel secured on the countershaft and gearing into a toothed pinion d' secured on the driving-shaft C. The countershaft D has two toothed pinions e secured on it, and these pinions gear into two toothed wheels E. The wheels E are journaled on trunnions f which project from side-plates F secured to the frame A. A crank-pin g is secured between the two wheels E, and G is a connecting-rod which connects the crank-pin with the slidable plunger.

In carrying out this invention, the shafts C and D are arranged over the wheels E and above the frame A, and they are journaled respectively in bearings C' and D' formed on a curved saddle or carriage H. The saddle H is secured to the side portions of the frame A, and it extends across it and incloses the upper portions of the wheels E. The said saddle forms a tie or brace plate which prevents the sides of the frame A from spreading, and it forms a guard for the wheel teeth so that they cannot be obstructed, and it also forms a steady foundation for the said bearings. This saddle enables the trunnions to support the wheels E in a satisfactory manner, and the said wheels do not have to be secured on a shaft.

I is the feeder-bar provided with a head i at its lower end, which is thrust into an opening in the press-chamber behind the plunger each time the plunger is drawn forward. The hay or other material to be baled is thrust into the path of the feeder-bar when same is in its raised position.

J are two uprights or posts which are secured to the sides of the frame A. A bracket j is secured between the top end portions of these posts, and it is provided with two upwardly and rearwardly projecting arms k at its sides, and a single downwardly projecting arm k' at its middle part arranged below the arms k and at an angle to them.

L are radius-rods pivoted to the arms k and to the upper end portion of the feeder-bar I by pins 2 and 3 respectively.

M are two connecting-rods pivoted to the plunger by a pin 4.

N are radius-links pivoted to the arms k by the said pins 2, and having their lower ends pivoted to the upper ends of the connecting-rods M by a pin 5.

Fig. 1 shows the parts with the feeder-bar in its lowest position, and the connecting-rods M and radius-links N then project across the uprights.

P is the feeder-arm formed of two bars secured together by distance-pieces p. The front end of the feeder-arm is pivoted to the arm k' of the supporting bracket j by a pin 6, and its rear end is pivoted to the middle part of the feeder-bar I by a pin 7.

R are T-shaped brackets which are also pivoted to the pin 6 at one end. The stems r of these brackets project downward, and are pivoted to links S by pins 8. The other ends of the links S are pivoted to the said pins 5. The top portions of the brackets R are provided with springs 10 for connecting them with the feeder-arm P so as to form a yieldable connection. Two springs 10 are preferably provided and are arranged in a similar manner.

Each spring 10 has a bolt 11 which extends through it, and which has a bearing-plate 12 for the spring on its lower end. The upper end of the bolt is connected to a bracket 13 secured to the feeder-arm P. The bracket R has a lug r' which normally bears against the underside of the feeder-arm P and prevents the bracket from rising too high. This spring connection yields when too much hay is pressed down under the feeder-bar, so that the feeding devices are not broken. Any other approved form of yieldable connection can be used in carrying out this invention.

When the feeder-bar I is raised as shown in Fig. 2, the rods L and links N, and the links S, are substantially in line with each other, and the crank-pin g is on its rear center. This arrangement causes the feeder-bar to make a long pause in its raised position and to move very slowly when near that position. As the feeder-bar I descends its motion becomes more rapid, and it forces the material into the press-chamber. The feeder-bar I makes a short pause when in its lowest position, as shown in Fig. 1, because the crank-pin is then on its forward center, but this pause is of comparatively short duration because the rods L and links N, and the links S, are forming acute angles with each other, and a little movement of the connecting-rods M has more effect on the feeder-arm P, than when the parts are in the positions shown in Fig. 2. The long pause on the up-stroke of the feeder-bar is a great advantage as it enables the material to be arranged in a satisfactory manner and in suitable quantity under the head of the feeder-bar.

The press is provided with blocks, block-dropping mechanism, a hay-folder, and retainers, of approved construction, which are not shown in the drawings as they do not form a part of the present invention.

T are tension-plates at the rear end portion of the press. The end portions of the press, 14, are channel-shaped and are separated by spaces 15 at their sides, and small blocks 16 are secured to the outer sides of these channel-shaped portions 14.

The tension-plates T have projections 17 which are arranged to slide between the blocks 16 so that the tension-plates can slide laterally but not vertically. Bars 18 are also secured to the tension-plates for connecting them with the baling-chamber B.

The tension-plates T can be set up toward or away from each other to vary the tension on the bales, but they cannot move bodily in any other direction. The top and bottom portions 14 can also be set up toward or away from each other, in the ordinary manner, by means of the bolts 25, if desired or necessary. The approach of the plates T however is chiefly relied on as the means for increasing the tension on the bales.

A channel 19 is formed at the middle part of each tension-plate and spaces 20 are left between its top and bottom edge and the channel-shaped parts 14 so as to form passages for the bale-tie wires which are secured in position around the bale in its passage between the baling-chamber B and the tension-plates.

Vertical tension-bars t, channel-shaped in cross-section, are secured to the middle parts of the tension-plates. These tension-bars t project above and below the parts 14, and they are connected together by tension-bolts 21. The tension-bolts 21 are provided with tension-springs 22 at one end, and have adjusting-nuts 23 on their other ends. Stops 24 formed of angle-shaped bars are secured to the parts 14 and together with the bars 18 prevent any rearward movement of the tension-plates. Bolts 25 extend between the stops 24 and prevent the parts 14 from spreading. A hopper-plate or guide-plate for the hay, 26, is secured to the top of the press on the front side of the opening through which the hay is thrust into the press-chamber.

What I claim is:

1. In a press, the combination, with a frame provided with a press-chamber, and a plunger slidable therein; of two trunnions secured to the sides of the said frame, two toothed wheels journaled on the said trunnions, a crank-pin extending between the said wheels, a connecting-rod between the said plunger and crank-pin, a saddle secured to the said frame over the said wheels and preventing the sides of the frame from spreading, shaft bearings carried by the said saddle, and driving mechanism supported in the said bearings and provided with two toothed pinions which gear into the said wheels.

2. In a press, the combination, with a frame provided with a press-chamber, and a plunger slidable therein; of uprights secured to the said frame and provided with upper and lower supporting arms arranged at an angle to each other, a feeder-bar for introducing the material into the press, a radius-rod connecting the upper part of the said feeder-bar with the upper arm, a feeder-arm operatively connecting the middle part of the said feeder-bar with the lower arm, a stem operatively connected with the said feeder arm and projecting downwardly thereof, a radius-link pivoted to the upper arm, a link pivotally connecting the lower end of the said radius-link with the said stem, and a connecting-rod between the lower end of the said radius-link and the said plunger.

3. In a press, the combination, with a frame provided with a press-chamber, and a plunger slidable therein; of uprights secured to the said frame and provided with upper and lower supporting arms arranged at an angle to each other, a feeder-bar for introducing the material into the press, a radius-rod connecting the upper part of the said feeder-bar with the upper arm, a feeder-arm operatively connecting the middle part of the said feeder-bar with the lower-arm, a bracket provided with a depending stem and pivoted at one end to the said feeder-arm and lower arm, a yielding spring-connection between the other end of the said bracket and the said feeder-arm, a radius-link pivoted to the upper arm, a link pivotally connecting the lower end of the said radius-link with the said stem, and a connecting-rod between the lower end of the said radius-link and the said plunger.

4. In a press, the combination, with a frame provided with a press-chamber, and a plunger slidable therein; of uprights secured to the said frame, two upper and rearwardly projecting arms and a lower and downwardly projecting arm supported by the said uprights, a feeder-bar for introducing the material into the press, radius-rods connecting the upper part of the said feeder-bar with the upper arms, a feeder-arm operatively connecting the middle part of the said feeder-bar with the lower arm, a stem operatively connected with the said feeder-arm and projecting downwardly thereof, radius-links pivoted to the upper arms, a link pivotally connecting the lower end of the said radius-links with the said stem, and connecting-rods pivoted to the said plunger and between the lower ends of the said radius-links.

5. The combination, with the rear end portion of a press having upper and lower parts and spaces between them, of tension-plates formed independent of the press and supported by the bottom part thereof and slidable laterally in the said spaces, means for preventing the said tension-plates from sliding longitudinally, and tension-bolts provided with springs and coupling the said tension-plates together.

6. The combination, with the rear end portion of a press having upper and lower parts and spaces between them, of blocks secured to the sides of the said parts, tension-plates formed independent of the press and supported by the bottom part thereof and having projections which slide laterally between the said blocks, means for preventing the said tension-plates from sliding longitudinally, tension-bars secured to the said tension-plates and projecting above and below the said upper and lower parts of the press, and tension-bolts provided with springs and engaging with the end portions of the said tension-bars.

7. The combination, with the rear end portion of a press having upper and lower parts and open side spaces between them, of guide-blocks secured to the said lower parts, tension-plates formed independent of the press and supported by the said guide-blocks and free to move laterally in the said side spaces, means for preventing the said tension-plates from sliding longitudinally, and tension-bolts provided with springs and coupling the said tension-plates together.

In testimony whereof I have affixed my signature in the presence of two witnesses.

DANIEL S. BEARD.

Witnesses:
G. A. ANDERSON,
J. STOVER PRICE.